United States Patent
Wildgrube

(10) Patent No.: US 9,731,594 B2
(45) Date of Patent: Aug. 15, 2017

(54) NATURAL GAS FILLING SYSTEM FOR A VEHICLE

(71) Applicant: Oshkosh Corporation, Oshkosh, WI (US)

(72) Inventor: Grant D. Wildgrube, Faribault, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 14/470,312

(22) Filed: Aug. 27, 2014

(65) Prior Publication Data

US 2016/0059690 A1   Mar. 3, 2016

(51) Int. Cl.
*B60K 15/03* (2006.01)
*F17C 5/06* (2006.01)
*F17C 5/00* (2006.01)

(52) U.S. Cl.
CPC ........ *B60K 15/03006* (2013.01); *F17C 5/007* (2013.01); *F17C 5/06* (2013.01); *B60K 2015/03019* (2013.01); *B60K 2015/03026* (2013.01); *B60K 2015/03414* (2013.01); *B60K 2015/03421* (2013.01); *F17C 2221/033* (2013.01); *F17C 2223/0123* (2013.01); *F17C 2223/036* (2013.01); *F17C 2225/0123* (2013.01); *F17C 2227/0339* (2013.01); *F17C 2227/0344* (2013.01); *F17C 2227/0358* (2013.01); *F17C 2227/0372* (2013.01); *F17C 2227/0388* (2013.01);

(Continued)

(58) Field of Classification Search
CPC ............ B60K 15/013; B60K 15/03006; B60K 2015/03013; B60K 2015/03019; B60K 2015/03026; B60K 2015/03296; B60K 2015/03414; F17C 5/06; F17C 2227/036; F17C 5/007
See application file for complete search history.

(56) References Cited

U.S. PATENT DOCUMENTS 5,542,459 A  *  8/1996  Price .................. F02B 43/00
                                                                141/18
5,992,219 A     11/1999  Otaka
(Continued)

OTHER PUBLICATIONS

U.S. Appl. No. 12/983,872, filed Jan. 3, 2011, Del Campo, Osvaldo.
(Continued)

*Primary Examiner* — Frank Vanaman
(74) *Attorney, Agent, or Firm* — Foley & Lardner LLP

(57) ABSTRACT

A natural gas filling system for a vehicle includes a piping system defining a first flow path, a receptacle, a tank, and a cooling circuit. The piping system includes a first end and a second end. The receptacle is coupled to the first end of the piping system, and the receptacle is configured to engage a natural gas filling station. The tank is in fluid communication with the receptacle and is configured to store a natural gas supply. The cooling circuit defines a second flow path and includes an expansion valve configured to reduce a pressure of a secondary fluid flow. The second flow path is in thermal communication with the first flow path such that heat transfer from the piping system into the cooling circuit cools the natural gas flowing between the receptacle and the tank.

2 Claims, 3 Drawing Sheets

(52) U.S. Cl.
CPC .. *F17C 2250/032* (2013.01); *F17C 2250/043* (2013.01); *F17C 2250/0439* (2013.01); *F17C 2250/0631* (2013.01); *F17C 2260/025* (2013.01); *F17C 2265/065* (2013.01); *F17C 2265/066* (2013.01); *F17C 2270/0168* (2013.01); *F17C 2270/0171* (2013.01)

(56) References Cited

U.S. PATENT DOCUMENTS

| | | | |
|---|---|---|---|
| 6,389,844 | B1 | 5/2002 | Klein Nagel Voort |
| 7,377,294 | B2 | 5/2008 | Handa |
| 7,406,987 | B2 | 8/2008 | Takano et al. |
| 7,637,292 | B2 | 12/2009 | Handa |
| 7,681,604 | B2 | 3/2010 | Handa |
| 7,735,528 | B2 | 6/2010 | Handa |
| 7,757,726 | B2 | 7/2010 | Handa |
| 7,757,727 | B2 | 7/2010 | Handa |
| 7,874,310 | B1 * | 1/2011 | Jansen .................. F01D 25/12 137/340 |
| 7,891,386 | B2 | 2/2011 | Handa |
| 7,938,149 | B2 | 5/2011 | Handa |
| 7,938,150 | B2 | 5/2011 | Handa |
| 8,100,151 | B2 | 1/2012 | Handa |
| 2007/0257043 | A1 * | 11/2007 | Kanoya ................. F17C 5/06 220/581 |
| 2007/0261756 | A1 * | 11/2007 | Handa .................. F17C 5/007 141/4 |
| 2008/0209916 | A1 * | 9/2008 | White .................. F17C 5/02 62/48.1 |
| 2012/0012225 | A1 * | 1/2012 | Moszkowski ........... F17C 5/06 141/4 |
| 2012/0216915 | A1 * | 8/2012 | Takata ................ F17C 5/06 141/82 |
| 2014/0224379 | A1 * | 8/2014 | Adler .................. F17C 5/06 141/4 |

OTHER PUBLICATIONS

U.S. Appl. No. 13/377,093, filed Dec. 29, 2011, De Jongste, Hendrikus.

* cited by examiner

NATURAL GAS FILLING SYSTEM FOR A VEHICLE

BACKGROUND

Vehicles powered by natural gas, such as compressed natural gas (CNG), traditionally include a piping system having a receptacle for transferring natural gas from a filling station (e.g., during a fast-fill operation, etc.) to a storage tank located on the vehicle. Natural gas is provided until the pressure of the natural gas in the storage tank onboard the vehicle has reached a target set point. Friction effects increase the temperature of the natural gas as it flows through the piping system during a filling process, which produces a friction-induced temperature increase of the CNG within the storage tank. The friction-induced temperature increase produces a corresponding friction-induced pressure increase.

The friction-induced pressure increase may cause a filling station to stop the flow of CNG before the storage tank is completely filled. By way of example, the filling station may stop the flow of CNG before the storage tank has been filed with an amount of CNG that could be stored at ambient temperature. The pressure of the CNG decreases as it cools to ambient temperature, thereby leaving the storage tank in an under-filled condition.

SUMMARY

One embodiment of the invention relates to a natural gas filling system for a vehicle that includes a piping system defining a first flow path, a receptacle, a tank, and a cooling circuit. The piping system includes a first end and a second end. The receptacle is coupled to the first end of the piping system, and the receptacle is configured to engage a natural gas filling station. The tank is coupled to the second end of the piping system, the tank is in fluid communication with the receptacle, and the tank is configured to store a natural gas supply. The cooling circuit defines a second flow path and includes an expansion valve configured to reduce a pressure of a secondary fluid flow. The second flow path is in thermal communication with the first flow path such that heat transfer from the piping system into the cooling circuit cools the natural gas flowing between the receptacle and the tank.

Another embodiment of the invention relates to a vehicle that includes a chassis having a frame, an engine coupled to the frame, and a natural gas filling system coupled to the chassis. The natural gas filling system includes a piping system defining a first flow path, a tank, and a cooling circuit defining a second flow path. The piping system includes a first end and a second end, and the first end of the piping system is configured to engage a natural gas filling station. The tank is coupled to the second end of the piping system. The tank is in fluid communication with the first end of the piping system and is configured to store a natural gas supply for combustion within the engine. The cooling circuit defines a second flow path. And the cooling circuit includes an expansion valve that is disposed along the second flow path and is configured to reduce a pressure of a secondary fluid flow. The second flow path is in thermal communication with the first flow path such that heat transfer from the piping system into the cooling circuit cools the natural gas flowing between the first end of the piping system and the tank.

Still another embodiment of the invention relates to a vehicle that includes a chassis, a natural gas filling system coupled to the chassis, and an air system. The chassis includes an engine and a plurality of wheel hubs coupled to a frame. The natural gas filling system includes a piping system defining a first flow path, a receptacle, and a cooling circuit defining a second flow path. The piping system includes a first end and a second end. The receptacle is coupled to the first end of the piping system, and the receptacle is configured to engage a natural gas filling station and provide a natural gas supply along the first flow path. The tank is coupled to the second end of the piping system. The tank is in fluid communication with the receptacle and is configured to store the natural gas supply for combustion within the engine. The cooling circuit includes an expansion valve that is disposed along the second flow path and is configured to reduce a pressure of a secondary fluid flow. The second flow path is in thermal communication with the first flow path such that heat transfer from the piping system into the cooling circuit cools the natural gas supply between the receptacle and the tank. The air system is coupled to the chassis and configured to provide the secondary fluid flow to the cooling circuit.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
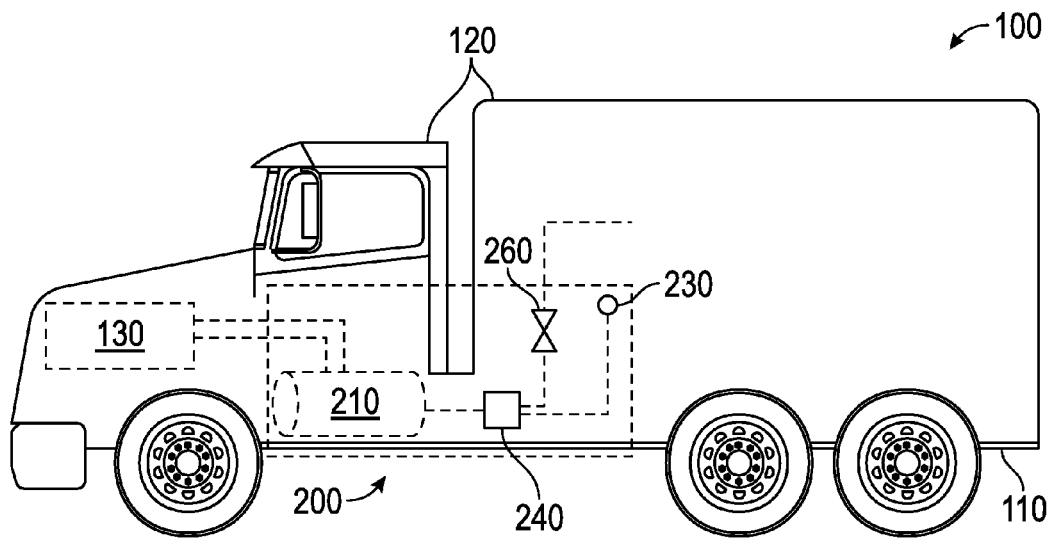
FIG. 1 is a side plan view of a vehicle including a natural gas filling system, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a natural gas filling system (e.g., a CNG filling system, etc.) for a natural gas-fueled vehicle includes a cooling circuit having an expansion valve (i.e., throttling valve, thermal expansion valve, etc.). In one embodiment, the cooling circuit is in thermal communication with a piping system defining a flow path along which CNG flows from a receptacle to a storage tank located on-board the vehicle. A working fluid (e.g., natural gas, air, etc.) flows through the cooling circuit during the filling process. The temperature of the working fluid decreases as it expands within the expansion valve (e.g., according to the Joule-Thomson effect, etc.), thereby creating a low-temperature working fluid. Thermal energy is transferred from the CNG into the low-temperature working fluid during the filling process to counteract the friction-induced temperature increase of the CNG that occurs as it flows through the piping system of the vehicle. The heat transfer into the working fluid cools the CNG (e.g., reduces the temperature of the CNG to an ambient temperature, to a level below an ambient temperature, etc.). The natural gas filling system thereby fills the storage tank to a target pressure level and prevents the filling station from prematurely stopping the filling process.

In one embodiment, a manual shut-off valve is positioned along the piping system (e.g., along the flow path for the CNG). The low-temperature working fluid or an intermediate coolant may flow across the manual shut-off valve to cool the CNG. According to another exemplary embodiment, the low-temperature working fluid or an intermediate coolant flows across another component of the filling system. By way of example, a heat exchanger may be positioned along the cooling circuit, and coolant may flow between the heat exchanger and the manual shut-off valve along a coolant flow path. In another embodiment, the low-temperature working fluid is configured to flow through a heat exchanger positioned along the piping system to decrease the temperature of the natural gas. In still another embodiment, coolant flows between a first heat exchanger positioned along the piping system and a second heat exchanger positioned along the cooling circuit to decrease the temperature of the natural gas.

According to an exemplary embodiment, natural gas from the filling station is configured to flow along the cooling circuit. By way of example, the natural gas filling system may include a splitting valve positioned along the piping system to direct a portion of the natural gas supply from the filling station along the cooling circuit. By way of another example, the filling station or filling system may include a separate natural gas fueling line that engages the cooling circuit. The cooling circuit may direct the natural gas back to the fueling system for reuse. In another embodiment, compressed air is the working fluid expanded in the expansion valve. The compressed air may be provided by an onboard air system or an external air system.

Figure 2:
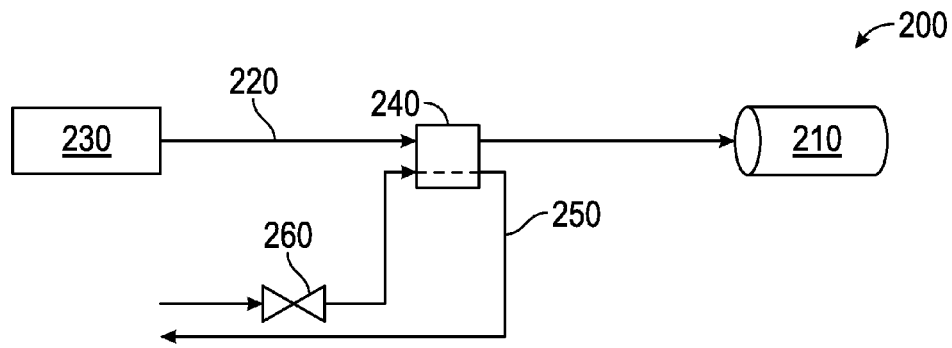
FIG. 2 is a schematic view of a natural gas filling system for a vehicle, according to an exemplary embodiment.

Referring to the exemplary embodiment shown in FIGS. 1-2, a vehicle, shown as a natural gas fueled vehicle 100, includes a natural gas filling system, shown as a natural gas filling system 200. In various exemplary embodiments, the natural gas fueled vehicle 100 may be a refuse vehicle (e.g., a garbage truck, etc.), a military vehicle, a fire apparatus, or another type of vehicle. As shown in FIG. 1, the natural gas fueled vehicle 100 includes a chassis, shown as a chassis 110. The chassis 110 may include a frame disposed along a bottom portion of the chassis 110. According to the exemplary embodiment shown in FIG. 1, the natural gas fueled vehicle 100 includes a body, shown as a body 120, disposed above the chassis 110. The natural gas fueled vehicle 100 also includes an engine 130 coupled to the frame of the chassis 110. The engine 130 is operatively coupled to the natural gas filling system 200 such that a flow of natural gas powers (e.g., fuels, etc.) the engine 130.

Referring again to the exemplary embodiment shown in FIGS. 1-2, natural gas filling system 200 includes a tank, shown as a tank 210. Tank 210 is configured to hold (e.g., contain, receive, etc.) a volume of natural gas (e.g., CNG, etc.). Tank 210 is coupled to natural gas fueled vehicle 100, according to an exemplary embodiment. As shown in FIG. 1, tank 210 is coupled to a portion of chassis 110 and positioned in a location normally occupied by conventional fuel tanks (e.g., diesel fuel tanks, etc.). According to a various alternative embodiments, tank 210 may be coupled to a top portion, a rear portion, or a top and rear portion of body 120 (e.g., a roof of a storage container associated with a refuse vehicle, a tailgate associated with a refuse vehicle, etc.). In one embodiment, tank 210 is operatively coupled to (e.g., provides fuel to power, etc.) engine 130. A flow of natural gas may be provided to the engine 130 from the tank 210. Tank 210 may be operatively coupled to the engine 130 with a piping system that includes one or more conduits defining a flow path for natural gas.

According to an exemplary embodiment, tank 210 is configured to receive natural gas from a natural gas filling station via a piping system, shown as piping system 220. Piping system 220 may define a first flow path along which a natural gas supply flows from a source, such as a natural gas filling station (e.g., during a fast-fill fueling operation, etc.). Piping system 220 includes a proximal end (i.e., a first end) having a receptacle, shown as receptacle 230. Piping system 220 includes a distal end (i.e., a second end) coupled to tank 210 such that a natural gas supply may flow along the first flow path to be received by tank 210. According to an exemplary embodiment, receptacle 230 is configured to engage a natural gas filling station to receive a flow of natural gas. According to the exemplary embodiment shown in FIG. 1, receptacle 230 is positioned along an outer surface of natural gas fueled vehicle 100. According to alternative embodiments, receptacle 230 is positioned at another location on the natural gas fueled vehicle 100 and may engage a natural gas filling station to receive a flow of natural gas.

According to the exemplary embodiment shown in FIG. 2, natural gas filling system 200 includes a shut-off valve, shown as shut-off valve 240. Shut-off valve 240 may include a manual shut-off valve (e.g., a manual shut-off valve positioned to satisfy one of various regulations that may apply to the manufacture or use of a natural gas fueled vehicle, etc.). As shown in FIG. 2, shut-off valve 240 is disposed along the first flow path of the piping system 220 between the tank 210 and the receptacle 230. According to an alternative embodiment, shut-off valve 240 is located along a different portion of the first flow path between the tank 210 and the receptacle 230. In one embodiment, shut-off valve 240 is a manual shut-off valve configured to stop (e.g., shut off, close off, etc.) CNG from flowing along the first flow path (e.g., from the receptacle 230 to the tank 210). According to other exemplary embodiments, shut-off valve 240 is another type of valve that regulates a natural gas supply flow along the first flow path.

According to the exemplary embodiment shown in FIG. 2, natural gas filling system 200 includes a cooling circuit, shown as cooling circuit 250. Cooling circuit 250 defines a second flow path along which a working fluid (e.g., natural gas, air, etc.) flows. Cooling circuit 250 is in thermal communication with piping system 220 and the first flow path, according to an exemplary embodiment. Cooling circuit 250 may include a conduit or a plurality of conduits configured to circulate a fluid therein. According to an exemplary embodiment, the fluid of cooling circuit 250 is a gas (e.g., CNG, air, etc.). According to other alternative embodiments, the fluid is a coolant or another type of fluid that absorbs heat from a supply flow of natural gas.

According to an exemplary embodiment, cooling circuit 250 includes an expansion valve, shown as expansion valve 260 (e.g., thermal expansion valve, thermostatic valve, pressure reducing valve, throttling valve, etc.). Expansion valve 260 is disposed along the cooling circuit 250 (e.g., along the second flow path), according to an exemplary embodiment, such that the fluid flowing along the cooling circuit 250 flows through expansion valve 260. The expansion valve 260 is configured to reduce the pressure of at least a portion of the volume of fluid flowing along the cooling circuit 250 (e.g., a secondary fluid flow, etc.). The pressure reduction produces a corresponding temperature reduction in the secondary fluid flow, according to an exemplary embodiment. The lower-temperature fluid may be circulated along the cooling circuit 250 and absorbs heat to cool a natural gas supply flowing along the piping system 220 (e.g., the first flow path).

As shown in FIG. 2, shut-off valve 240 places cooling circuit 250 in thermal communication with the first flow path. The one or more conduits of the cooling circuit 250 (e.g., the second flow path) may be routed along the shut-off valve 240 such that a heat transfer occurs from the natural gas supply flowing along the piping system 220 (e.g., the first flow path) into the working fluid flowing along the cooling circuit 250 (e.g., along the second flow path). The cooled secondary fluid flow of the cooling circuit 250 thereby reduces the temperature of the natural gas supply flowing along the piping system 220 from the receptacle 230 to the tank 210. The cooling circuit 250 thereby reduces the risk of under filling the tank 210.

Figure 3:
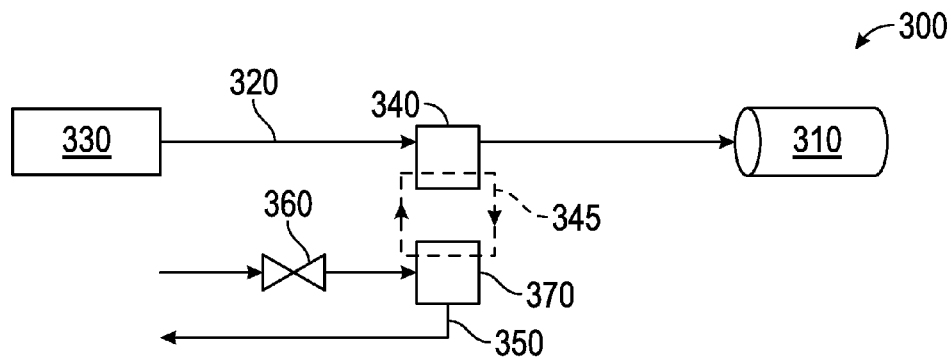
FIG. 3 is a schematic view of a natural gas filling system for a vehicle, according to another exemplary embodiment.

Referring next to the exemplary embodiment shown in FIG. 3, a natural gas filling system 300 for a vehicle includes a tank, shown as tank 310. Tank 310 is coupled to a receptacle, shown as receptacle 330, with a piping system, shown as piping system 320. Piping system 320 defines a first flow path along which a natural gas supply flows. Natural gas filling system 300 includes a shut-off valve, shown as shut-off valve 340, disposed along the piping system 320 (e.g., along the first flow path). A cooling circuit, shown as cooling circuit 350, defines a second flow path that is in thermal communication with the piping system 320. A conduit 345, defines a third flow path between the cooling circuit 350 and the piping system 320. According to an exemplary embodiment, conduit 345 is coupled to shut-off valve 340. A volume of coolant flows along the third flow path, according to an exemplary embodiment. The coolant absorbs heat from a natural gas supply flowing along the piping system 320 (e.g., along the first flow path) and through the shut-off valve 340 during a filling process.

As shown in FIG. 3, cooling circuit 350 includes an expansion valve, shown as expansion valve 360, disposed along the second flow path. Cooling circuit 350 further includes a heat exchanger, shown as heat exchanger 370, disposed along the cooling circuit 350 (e.g., along the second flow path) downstream of the expansion valve 360. Heat exchanger 370 is also disposed along the third flow path of conduit 345. Heat exchanger 370 is configured to facilitate heat transfer between a working fluid flowing along the cooling circuit 350 (e.g., along the second flow path) and the coolant flowing along the conduit 345 (e.g., along the third flow path) during a filling process.

During a filling process, a secondary fluid flow along cooling circuit 350 expands in expansion valve 360, thereby lowering the temperature of the working fluid. The lower-temperature working fluid circulates along the cooling circuit 350 through heat exchanger 370, according to an exemplary embodiment. The lower-temperature fluid may absorb heat from the coolant flowing along the third flow path to lower the temperature of the coolant. The lower-temperature coolant may flow along the conduit 345 (e.g., along the third flow path) to the shut-off valve 340 and absorb heat from the natural gas supply associated with the piping system 320 (e.g., the first flow path) during the filling process. In this manner, the cooling circuit 350 including the expansion valve 360, the heat exchanger 370, and the conduit 345 (e.g., the third flow path) defines a cooling system that reduces the temperature of a natural gas supply flowing along the piping system 320 (e.g., the first flow path) from the receptacle 330 to the tank 310 during the filling process (i.e., the natural gas supply is cooled, etc.).

Figure 4:
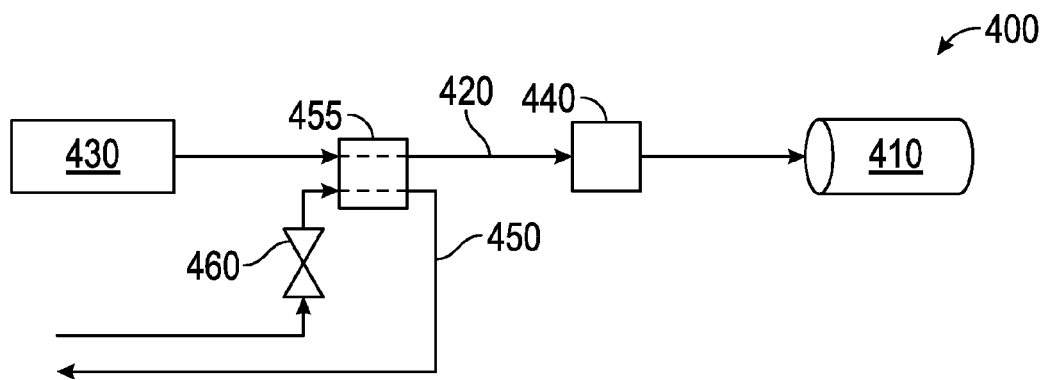
FIG. 4 is a schematic view of a natural gas filling system for a vehicle, according to another exemplary embodiment.

Referring next to the exemplary embodiment shown in FIG. 4, a natural gas filling system 400 for a vehicle includes a tank, shown as tank 410. Tank 410 is coupled to a receptacle, shown as receptacle 430, with a piping system, shown as piping system 420. Piping system 420 may define a first flow path for a natural gas supply. As shown in FIG. 4, natural gas filling system 400 includes a shut-off valve, shown as shut-off valve 440, disposed along the first flow path of the piping system 420. A cooling circuit 450 defines a second flow path that is in thermal communication with the piping system 420, according to an exemplary embodiment. A heat exchanger, shown as heat exchanger 455, thermally couples cooling circuit 450 and piping system 420. Heat exchanger 455, is disposed along both the piping system 420 (e.g., the first flow path), and the cooling circuit 450 (e.g., the second flow path), according to the exemplary embodiment shown in FIG. 4. Heat exchanger 455 is configured to facilitate heat transfer between a natural gas supply flow associated with the piping system 420 (e.g., the first flow path) and a working fluid flowing along the cooling circuit 450 (e.g., the second flow path). As shown in FIG. 4, cooling circuit 450 includes an expansion valve, shown as expansion valve 460, disposed along the second flow path. Expansion valve 460 is configured to reduce the pressure of the working fluid flowing along the cooling circuit 450, to thereby reduce the temperature of the supply flow of natural gas.

During a natural gas filling process, a natural gas supply flow from receptacle 430 to tank 410 may pass through heat exchanger 455 along the first flow path. The pressure of a working fluid flowing along the cooling circuit 450 (e.g., along the second flow path) is reduced in the expansion valve 460, which reduces the temperature of the working fluid. The working fluid circulates along the second flow path through the heat exchanger 455 where it absorbs energy from the natural gas supply flow of the first flow path. Heat exchanger 455 may be configured to facilitate such heat transfer. The temperature of the natural gas supply is thereby reduced before it enters the tank 410.

According to an alternative embodiment, natural gas filling system 400 includes a refrigeration system. By way of example, cooling circuit 450 may define at least a portion of a refrigeration system. The refrigeration system may operate according to a traditional refrigeration cycle. In one embodiment, the refrigeration system includes a compressor, a condenser, an expansion valve (e.g., expansion valve 460, etc.), and an evaporator. The compressor may be powered by an engine of the vehicle or by a separate device (e.g., a separate motor, etc.), according to various embodiments. A working fluid (e.g., R134a, etc.) may flow through the compressor, condenser, expansion valve, and evaporator and absorb heat to cool the supply flow of natural gas along piping system 420. According to an exemplary embodiment, the evaporator includes heat exchanger 455. In other embodiments, the evaporator forms at least a portion of a shut-off valve associated with a natural gas filling system (e.g., shut-off valve 440, etc.). According to an exemplary embodiment, the refrigeration system used to cool the supply flow of natural gas along piping system 420 is also used to cool at least one of a cargo area and a cabin associated with the vehicle (i.e., the supply flow of natural gas along piping system 420 may be cooled with an existing refrigeration or air-conditioning system traditionally used to cool the cabin or a refrigerated cargo area, etc.). According to an alternative embodiment, the vehicle includes a separate refrigeration system used to cool the supply flow of natural gas along piping system 420.

Figure 5:
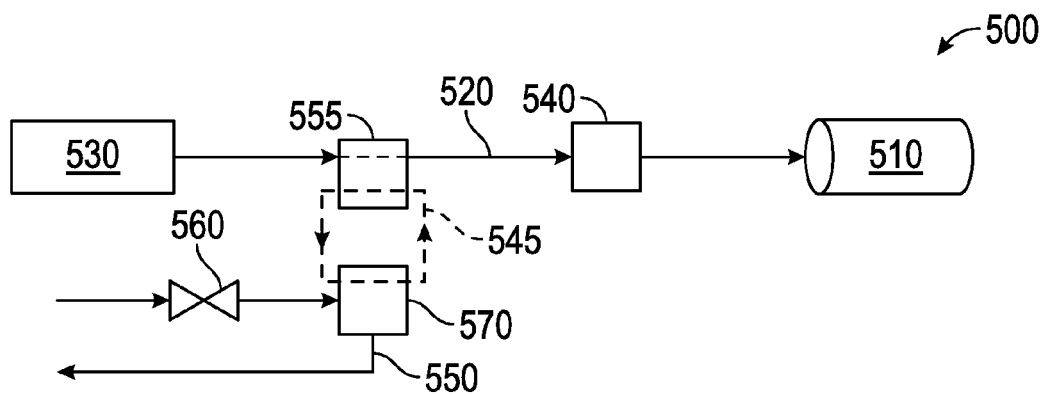
FIG. 5 is a schematic view of a natural gas filling system for a vehicle, according to another exemplary embodiment.

Referring next to the exemplary embodiment shown in FIG. 5, a natural gas filling system 500 for a vehicle includes a tank, shown as a tank 510. Tank 510 is coupled to a receptacle, shown as receptacle 530, with a piping system, shown as piping system 520. According to an exemplary embodiment, piping system 520 defines a first flow path that receives a natural gas supply. As shown in FIG. 5, natural gas filling system 500 includes a shut-off valve, shown as shut-off valve 540, disposed along the first flow path of piping system 520. According to an exemplary embodiment, a cooling circuit 550 defining a second flow path is in thermal communication with the piping system 520. A conduit 545, defines a third flow path and couples cooling circuit 550 with piping system 520. Conduit 545 is in fluid communication with a first heat exchanger, shown as first heat exchanger 555, disposed along the piping system 520 and a second heat exchanger, shown as second heat exchanger 570, disposed along the cooling circuit 550. Conduit 545 is configured to facilitate heat transfer between a natural gas supply flow along the first flow path and a working fluid flow along the conduit 545 (e.g., along the third flow path). Second heat exchanger 570 is configured to facilitate heat transfer between the working fluid flow of the conduit 545 and a fluid (e.g., natural gas, air, etc.) associated with the cooling circuit 550 (e.g., the second flow path). As shown in FIG. 5, cooling circuit 550 includes an expansion valve, shown as expansion valve 560, disposed along the second flow path. Expansion valve 560 is configured to reduce the pressure of the working fluid flowing along the cooling circuit 550, thereby reducing the temperature of the working fluid and producing heat transfer into the cooling circuit 550.

During a filling process, a natural gas supply flow from receptacle 530 to tank 510 may pass through first heat exchanger 555 along the first flow path. Coolant flowing along the conduit 545 (e.g., along the third flow path) may absorb heat from the natural gas supply flow through the first heat exchanger 555. The natural gas supply may thereby be cooled before it enters the tank 510. A working fluid circulates along the second flow path through the second heat exchanger 570, where heat transfer occurs from the coolant into the fluid of cooling circuit 550 by way of second heat exchanger 570.

Figure 6:
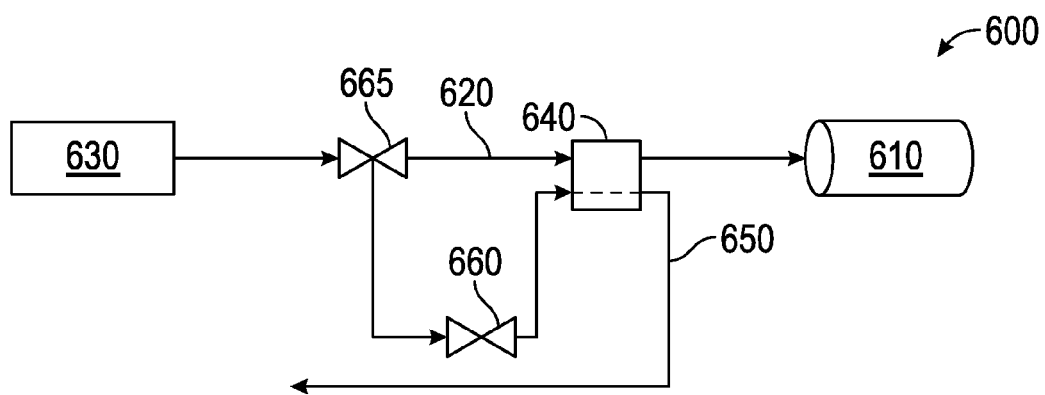
FIG. 6 is a schematic view of a natural gas filling system for a vehicle, according to another exemplary embodiment.

Referring next to the exemplary embodiment shown in FIG. 6, a natural gas filling system 600 for a vehicle includes a tank, shown as a tank 610. Tank 610 is coupled to a receptacle, shown as receptacle 630, with a piping system, shown as piping system 620. Piping system 620 defines a first flow path for a natural gas supply. Natural gas filling system 600 includes a shut-off valve, shown as shut-off valve 640, disposed along the piping system 620 (e.g., along the first flow path). Natural gas filling system 600 includes a splitting valve (e.g., diverter valve, etc.), shown as valve 665, disposed along the first flow path between the receptacle 630 and the shut-off valve 640. A cooling circuit, shown as cooling circuit 650, defines a second flow path in fluid communication with the valve 665. Valve 665 is configured to divert at least a portion of a natural gas supply provided by receptacle 630 (e.g., from a natural gas filling station, etc.) to cooling circuit 650. As shown in FIG. 6, cooling circuit 650 includes an expansion valve, shown as expansion valve 660, disposed along the second flow path. Expansion valve 660 is configured to reduce the pressure of the natural gas received from valve 665, thereby reducing the temperature of the flow of natural gas downstream of expansion valve 660. Cooling circuit 650 is in thermal communication with shut-off valve 640. In other embodiments, cooling circuit 650 is otherwise thermally coupled to the first flow path.

During a filling process, a natural gas supply provided by receptacle 630 flows along the piping system 620 (e.g., along the first flow path). At least a portion of the natural gas supply is diverted to the cooling circuit 650 (e.g., and flows along the second flow path) with the valve 665. A remaining portion of the natural gas supply continues to flow along the first flow path toward tank 610. The portion of the natural gas supply flowing along the cooling circuit 650 expands within the expansion valve 660, thereby decreasing a temperature of the natural gas associated with the cooling circuit 650 downstream of expansion valve 660. The natural gas having a reduced temperature may flow along the shut-off valve 640 to absorb heat from the natural gas supply flowing along the first flow path toward tank 610. The temperature of the natural gas supply flowing along the first flow path toward the tank 610 is thereby reduced during the filling process.

Figure 7:
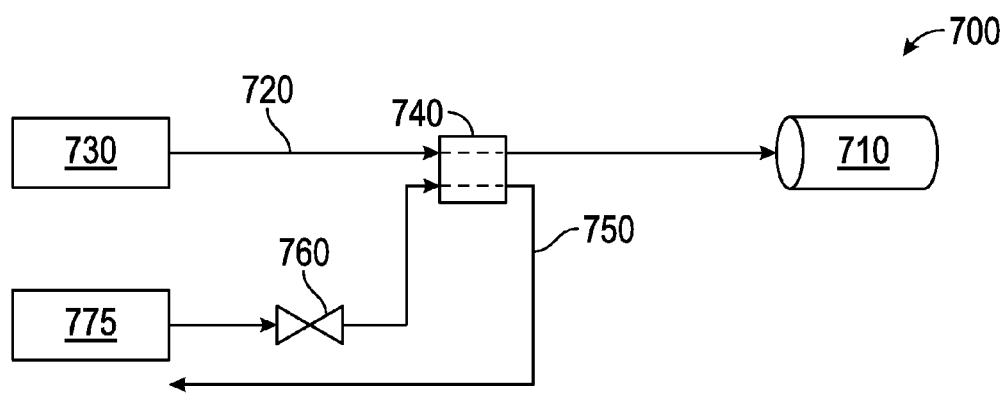
FIG. 7 is a schematic view of a natural gas filling system for a vehicle, according to another exemplary embodiment.

Referring next to the exemplary embodiment shown in FIG. 7, a natural gas filling system 700 for a vehicle includes a tank, shown as a tank 710. Tank 710 is coupled to a receptacle, shown as receptacle 730, with a piping system, shown as piping system 720. Piping system 720 defines a first flow path for a first flow of natural gas, according to an exemplary embodiment. As shown in FIG. 7, natural gas filling system 700 includes a shut-off valve, shown as shut-off valve 740, disposed along the piping system 720 (e.g., along the first flow path). Natural gas filling system 700 includes a cooling circuit, shown as cooling circuit 750, defining a second flow path and configured to circulate a second flow of natural gas through a conduit. Cooling circuit 750 is in thermal communication with the piping system 720. In one embodiment, receptacle 730 is configured to receive a first natural gas supply from a natural gas filling station and cooling circuit 750 is configured to receive a second natural gas supply from the natural gas filling station.

As shown in FIG. 7, cooling circuit 750 includes a receptacle, shown as receptacle 775, that is configured to be coupled to the natural gas filling station. According to an exemplary embodiment, cooling circuit 750 includes an expansion valve, shown as expansion valve 760, disposed along the second flow path. Expansion valve 760 is configured to reduce the pressure of the natural gas supply associated with the second flow path, thereby reducing a temperature of the second natural gas supply. Cooling circuit 750 is in thermal communication with the piping system 720 and the first flow path by way of shut-off valve 740. Cooling circuit 750 may provide the expanded natural gas along shut-off valve 740 to thereby cool the first natural gas supply flowing through the shut-off valve 740 and along the first flow path.

During a filling process, a first natural gas supply is provided along the first flow path, through the shut-off valve 740, and to tank 710. A second natural gas supply received by receptacle 775 flows along the second flow path through the expansion valve 760. At least a portion of the second natural gas supply expands in the expansion valve 760, thereby reducing the temperature of the second natural gas supply. The second natural gas supply having a reduced temperature flows along the shut-off valve 740 and the second flow path, where thermal energy is transferred into the second natural gas supply from the first flow of natural gas flowing along the first flow path toward the tank 710. The first natural gas supply flowing to the tank 710 is thereby cooled during the filling process. According to an exemplary embodiment, the second flow of natural gas flowing along the second flow path can flow back to the natural gas filling station for reuse (e.g., through a connector associated with receptacle 775, through a separate connector, etc.).

Figure 8:
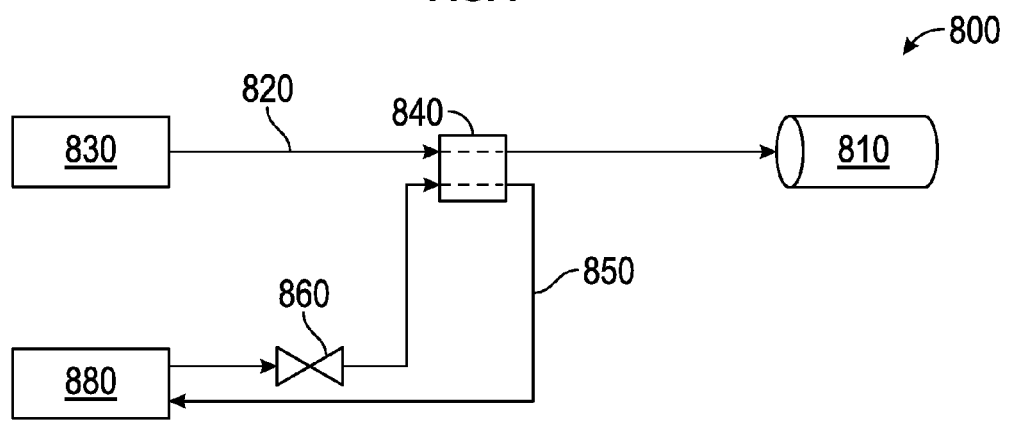
FIG. 8 is a schematic view of a natural gas filling system for a vehicle, according to another exemplary embodiment.

Referring next to the exemplary embodiment shown in FIG. 8, a natural gas filling system 800 for a vehicle includes a tank, shown as tank 810. Tank 810 is coupled to a receptacle, shown as receptacle 830, with a piping system, shown as piping system 820. Piping system 820 defines a first flow path for a natural gas supply. Natural gas filling system 800 includes a shut-off valve, shown as shut-off valve 840, disposed along the piping system 820 (e.g., along the first flow path).

As sown in FIG. 8, natural gas filling system 800, includes a cooling circuit, shown as cooling circuit 850, defining a second flow path along which air (e.g., compressed air, etc.) is provided. Cooling circuit 850 is in thermal communication with the piping system 820. Cooling circuit 850 is configured to receive air from an air system (e.g., an air compressor system, etc.), shown as air system 880. According to an exemplary embodiment, air system 880 is located on-board a vehicle (e.g., natural gas fueled vehicle 100). Air system 880 may also provide air to various other pneumatic vehicle systems (e.g., brakes, horn, etc.). According to an alternative embodiment, air system 880 is an external system located remotely relative to the vehicle. Cooling circuit 850 further includes an expansion valve, shown as expansion valve 860, disposed along the second flow path. Expansion valve 860 is configured to reduce the pressure of the air received from the air system 880 and flowing along the second flow path, thereby also reducing the temperature of the air. As shown in FIG. 8, cooling circuit 850 is in thermal communication with the shut-off valve 840 of the piping system 820. In other embodiments, cooling circuit 850 is in thermal communication with another portion of the first flow path (e.g., another portion of the piping system 820, etc.). As shown in FIG. 8, cooling circuit 850 is configured to provide expanded and cooled air along shut-off valve 840, thereby cooling the natural gas supply flowing along the first flow path toward the tank 810.

During a filling process, a natural gas supply flows along the first flow path, through the shut-off valve 840, and to tank 810. Air from air system 880 flows along the second flow path and through the expansion valve 860. The pressure of the air decreases as if flows through the expansion valve 860, thereby reducing the temperature of the air. The expanded air flows along the shut-off valve 840 via the second flow path. The expanded air absorbs heat from the natural gas supply flowing through the shut-off valve 840 along the first flow path. The natural gas supply flowing to the tank 810 is thereby cooled. In one embodiment, the air flowing along the second flow path flows back to the air system 880 for reuse. In other exemplary embodiments, the expanded air is vented to the ambient environment.

According to various exemplary embodiments, the extent to which the natural gas supply is cooled may be adjusted (e.g., tuned, etc.) to achieve a target natural gas supply temperature (e.g., ambient temperature at the tank, etc.). By way of example, the amount of cooling may be tuned by varying at least one of the size or another feature of the expansion valve used in the cooling circuit, the size or configuration of the conduit(s) (e.g., that form portions the first and second flow paths), the size of the heat exchanger (s), and the flow through the cooling circuit. Adjusting or tuning the amount of cooling may reduce the risk of over-cooling the natural gas supply flowing from the receptacle to the tank during a filling process and may reduce the risk of overfilling of the tank. According to an exemplary embodiment, the natural gas filling systems disclosed herein facilitate consistently filling a vehicle CNG storage tank without the risk of over- or under-filling. The cooling circuits or other components may be tuned to correspond with the piping used for the particular vehicle's CNG fueling system, thereby further reducing the risk of over- or under-filling the vehicle CNG storage tank.

Figure 9:
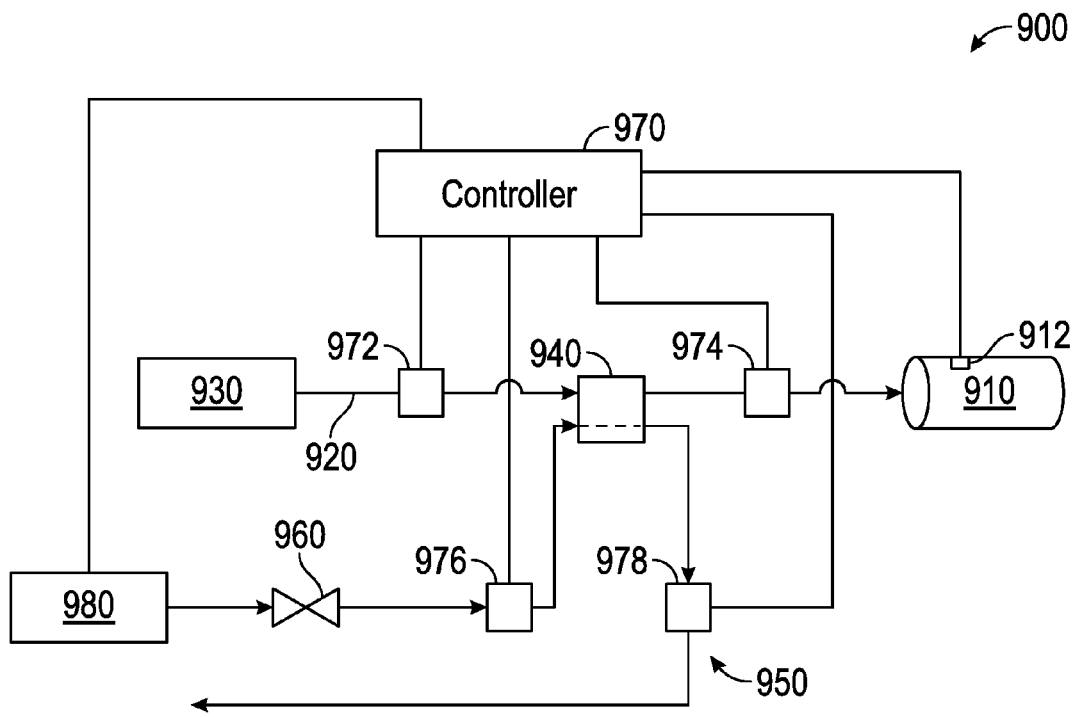
FIG. 9 is a schematic view of a natural gas filling system for a vehicle, according to another exemplary embodiment.

As shown in FIG. 9, a natural gas filling system 900 for a vehicle includes a tank, shown as tank 910. Tank 910 is coupled to a receptacle, shown as receptacle 930, with a piping system, shown as piping system 920. Piping system 920 defines a first flow path for a natural gas supply. Natural gas filling system 900 includes a shut-off valve, shown as shut-off valve 940, disposed along the piping system 920 (e.g., along the first flow path). According to an exemplary embodiment, natural gas filling system 900, includes a cooling circuit, shown as cooling circuit 950, defining a second flow path along which a working fluid flows (e.g., natural gas from the supply flow provided along piping system 920, natural gas separately provided by a filling station, compressed air, a fluid associated with a refrigeration system, etc.). according to the embodiment shown in FIG. 9, cooling circuit 950 further includes an expansion valve, shown as expansion valve 960, disposed along the second flow path. According to an exemplary embodiment, cooling circuit 950 and tank 910 are both disposed onboard a vehicle. The cooling circuit 950 may absorb heat from the supply flow of natural gas to cool the natural gas before it enters tank 910. In other embodiments, cooling circuit 950 absorbs heat to cool natural gas while the natural gas is disposed within tank 910 (i.e., after the natural gas supply has entered tank 910, etc.).

According to the exemplary embodiment shown in FIG. 9, natural gas filling system 900 includes a controller 970. Controller 970 may be configured to at least one of control and monitor the operating conditions of natural gas filling system 900 as part of a filling operation. As shown in FIG. 9, natural gas filling system includes a first sensor 972, a second sensor 974, a third sensor 976, and a fourth sensor 978. First sensor 972, second sensor 974, third sensor 976, and fourth sensor 978 are coupled to (e.g., communicate with, send signals to, receive signals from, etc.) controller 970. As shown in FIG. 9, first sensor 972 is positioned along piping system 920 upstream of shut-off valve 940, and second sensor 974 is positioned along piping system 920 downstream of shut-off valve 940. Third sensor 976 and fourth sensor 978 are disposed along the second flow path of cooling circuit 950 upstream and downstream of shut-off valve 940, respectively. In other embodiments, first sensor 972 and third sensor 976 are positioned upstream of one or more heat exchangers associated with the first flow path and the second flow path, while second sensor 974 and fourth sensor 978 are positioned downstream of one or more heat exchangers associated with the first flow path and the second flow path, respectively. As shown in FIG. 9, a tank sensor 912 is coupled to controller 970 and positioned to monitor a condition of the natural gas within tank 910. Natural gas filling system 900 may include any combination of first sensor 972, second sensor 974, third sensor 976, fourth sensor 978, and tank sensor 912 or still other sensors.

According to an exemplary embodiment, first sensor 972, second sensor 974, third sensor 976, fourth sensor 978, and tank sensor 912 are configured to provide sensing signals relating to a measured condition. By way of example, the measured condition may include at least one of temperature and pressure. At least one of first sensor 972, second sensor 974, third sensor 976, fourth sensor 978, and tank sensor 912 may include multiple sensor elements configured to provide sensing signals in response to different measured conditions. Controller 970 may receive the sensing signals and monitor the measured condition at various positions along piping system 920 and cooling circuit 950.

Referring still to the exemplary embodiment shown in FIG. 9, natural gas filling system 900 includes a regulator 980. Regulator 980 may include a valve or other device positioned to vary the flow of a working fluid (e.g., natural gas from the supply flow provided along piping system 920, natural gas separately provided by a filling station, compressed air, a fluid associated with a refrigeration system, etc.) along cooling circuit 950. Regulator 980 includes an actuator (e.g., solenoid valve, etc.) configured to engage the valve in response to a command signal provided by controller 970, according to an exemplary embodiment. In other embodiments, regulator 980 includes a valve or other device positioned to vary a bypass flow of the natural gas supply (e.g., along a bypass flow path around shut-off valve 940 or a heat exchanger associated with the first flow path, etc.) to thereby change the temperature and pressure of the natural gas associated with tank 210 (e.g., disposed within tank 210, entering tank 210, flowing toward tank 210, etc.). In one embodiment, controller 970 selectively engages regulator 980 in response to the sensing signals provided by at least one of first sensor 972, second sensor 974, third sensor 976, fourth sensor 978, and tank sensor 912 exceeding or falling below a threshold value or range. By way of example, controller 970 may selectively engage regulator 980 in response to an indication that at least one of the temperature and pressure of the natural gas associated with tank 910 is greater than or less than a threshold value or range. Controller 970 may thereby actively control (e.g., during a filling operation, etc.) at least one of the temperature and the pressure of the natural gas associated with tank 210 to reduce the risk of over- or under-filling tank 210.

According to an exemplary embodiment, a method of filling a tank onboard a natural gas powered vehicle includes engaging a natural gas filling station with a receptacle. The receptacle is coupled to the tank with an onboard piping system, according to an exemplary embodiment. The method also includes cooling a supply of natural gas flowing through the onboard piping system with a cooling circuit that is also positioned onboard the vehicle. In one embodiment, the cooling circuit includes an expansion valve configured to decrease the pressure of a working fluid. The method may also include selectively engaging a regulator with a controller in response to an indication (e.g., based on sensor signals provided by a sensor, etc.) that a condition (e.g., temperature, pressure, etc.) of a fluid flowing along at least one of the onboard piping system and the cooling circuit is outside of a target range.

The terms "coupled," "connected," and the like, as used herein, mean the joining of two members directly or indirectly to one another. Such joining may be stationary (e.g., permanent, etc.) or moveable (e.g., removable or releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element (e.g., expansion valve, first and second heat exchangers, shut-off valve, etc.) disclosed in one embodiment may be incorporated or utilized with any other embodiment disclosed herein.

What is claimed is:

1. A vehicle, comprising:
   a chassis including a frame;
   an engine coupled to the frame; and
   a natural gas filling system onboard the vehicle and coupled to the chassis, the natural gas filling system comprising:
   a piping system defining a first flow path, the piping system including a first end and a second end, wherein the first end of the piping system is configured to engage a natural gas filling station;
   a tank coupled to the second end of the piping system, wherein the tank is in fluid communication with the first end of the piping system and is configured to store a natural gas supply for combustion within the engine;
   a manual shut-off valve disposed along the first flow path between the first end of the piping system and the tank; and
   a cooling circuit defining a second flow path, the cooling circuit including (a) an expansion valve disposed along the second flow path and configured to reduce a pressure of a secondary fluid flow to provide an expanded gas downstream of the expansion valve, the expanded gas having a temperature that is less than an initial temperature of the secondary fluid flow upstream of the expansion valve during operation of the cooling circuit and (b) an outlet downstream of the expansion valve and fluidly decoupled from the first flow path and the tank, wherein the cooling circuit is in direct thermal communication with the manual shut-off valve, placing the second flow path in thermal communication with the first flow path via the manual shut-off valve such that heat transfer from the piping system into the cooling circuit through the manual shut-off valve cools the natural gas flowing between the first end of the piping system and the tank and wherein the cooling circuit is tuned to correspond with the piping system specific to the vehicle to prevent over-filling or under-filling the tank.

2. The vehicle of claim 1, wherein the secondary fluid flow comprises natural gas.

* * * * *